UNITED STATES PATENT OFFICE.

HENRY V. DUNHAM, OF BAINBRIDGE, NEW YORK, ASSIGNOR TO CASEIN COMPANY OF AMERICA, A CORPORATION OF NEW JERSEY.

PAPER COATING AND SIZING COMPOSITION AND PROCESS.

962,498.

Specification of Letters Patent. Patented June 28, 1910.

No Drawing. Application filed June 18, 1909. Serial No. 502,886.

*To all whom it may concern:*

Be it known that I, HENRY V. DUNHAM, a citizen of the United States, residing at Bainbridge, in the county of Chenango and State of New York, have invented or discovered certain new and useful Improvements in Paper Coating and Sizing Compositions and Processes, of which the following is a specification.

In the art of paper coating and sizing, as now generally practiced, a coating and sizing composition comprising a mineral base and an adhesive, consisting usually of glue or casein, is largely in use. Such coating and sizing composition, however, gives the paper a stiff harsh feeling, after the paper has been dried and calendered; and to overcome this objectionable stiffness and harshness of the paper it has been common to use wax, emulsions, glycerin, soap, etc., in the coating and sizing compounds.

This invention or discovery has for its object to effect the paper coating and sizing operation by a composition which is comparatively inexpensive and which will coat and size the paper in such a manner as to leave the same soft and flexible. It has been discovered that a gluten which is a by-product in wheat starch factories and which has undergone fermentation to develop acetic acid, or which has been treated with acetic acid, will, when thus modified and mixed in a coating and sizing composition, consisting of a mineral base and glue or casein employed as an adhesive, result in the production of a comparatively inexpensive coating and sizing composition which leaves the paper soft and flexible when dried and calendered.

In carrying the invention into effect the gluten, in a wet state, is allowed to ferment for a few days, and acetic acid is thus formed therein, and such fermentation modifies or changes the character of the gluten in some way so that it will, when neutralized, mix with a suitable adhesive and form a good solution. Instead, however, of allowing the gluten to ferment it can be rendered in proper condition to mix with the adhesive and form a good solution by treating it with acetic acid, using ordinary commercial acetic acid in the proportion of about 20% of acid to 80% of dry gluten, although a somewhat larger or smaller percentage of acid may be used, if desired. After the acid has properly acted on the gluten and has modified or changed its character, as just above stated with regard to fermentation, the acid is neutralized. In either case the modified gluten is dried and ground to preferably about a sixty mesh, and is then mixed with an adhesive in dry comminuted condition, and consisting preferably of glue or casein in the proportions of about 25 or 30 parts of the gluten to about 75 or 70 parts of the glue or casein. This composition may be placed on the market in readiness to be used with any suitable mineral base, or it may be placed on the market mixed with a suitable dry mineral base. The gluten preferably employed in said composition is wheat gluten which is a by-product in wheat starch factories; but other gluten than wheat gluten may be employed if desired.

In the use of the coating and sizing composition the mixture of gluten and glue or casein, in about the proportions stated, will preferably first be dissolved, and to the solution will then be added the usual proportion of a suitable mineral base, when the composition will be ready for use, and will then be applied to the paper in any suitable or well-known manner.

Having thus described my invention or discovery, I claim and desire to secure by Letters Patent of the United States:

1. The herein described composition for paper coating and sizing, consisting of an adhesive and a modified and non-acidulous gluten mixed together in about the proportions specified.

2. The herein described composition for paper coating and sizing, consisting of about 25 parts of modified and non-acidulous comminuted wheat gluten and about 75 parts of a comminuted adhesive mixed together in dry condition.

3. The herein described process for preparing a paper coating and sizing composition consisting in modifying gluten by acidulating and then neutralizing the same, then drying and comminuting the gluten and mixing about 25 parts thereof with about 75 parts of a dried comminuted adhesive.

In testimony whereof I affix my signature, in presence of two witnesses.

HENRY V. DUNHAM.

Witnesses:
C. A. GRAHAM,
O. L. TRUMBO.